United States Patent

Bryant et al.

[11] Patent Number: 6,043,566
[45] Date of Patent: Mar. 28, 2000

[54] AIRBAG SUPPRESSION CONTROLLER WITH CRASH STATE EVIDENCE

[75] Inventors: Mark R Bryant, Kokomo; Charles Allen Gray, Noblesville; Troy Allen Wideman, Kokomo; Shailendra Verma, Indianapolis, all of Ind.; Anthony Luke Simon, Southfield, Mich.

[73] Assignee: Delco Electronics Corp., Kokomo, Ind.

[21] Appl. No.: 08/879,444

[22] Filed: Jun. 20, 1997

[51] Int. Cl.$^7$ .................................................. B60R 21/32
[52] U.S. Cl. ...................... 307/10.1; 307/38; 280/728.1; 280/735
[58] Field of Search .................................. 307/9.1, 10.1, 307/29, 38, 85, 112, 113, 116, 125, 139; 280/728.1, 734–735; 180/282–283; 340/436, 438; 701/45

[56] References Cited

U.S. PATENT DOCUMENTS

| | | | |
|---|---|---|---|
| 3,668,627 | 6/1972 | Brainerd | 280/735 |
| 4,695,075 | 9/1987 | Kamiji et al. | 280/735 |
| 4,956,631 | 9/1990 | Itoh | 340/436 |
| 5,023,529 | 6/1991 | Tennant | 318/266 |
| 5,071,038 | 12/1991 | Credle, Jr. et al. | 222/129.2 |
| 5,080,395 | 1/1992 | Morota et al. | 280/735 |
| 5,544,914 | 8/1996 | Borninski et al. | 280/735 |

*Primary Examiner*—Jeffrey Gaffin
*Assistant Examiner*—Kim Huynh
*Attorney, Agent, or Firm*—Jimmy L. Funke

[57] ABSTRACT

A switch selectively connects an airbag inflator or a load resistor to a crash sensing module to enable or disable an airbag. A transistor circuit across the load resistor detects whether deployment current is flowing in that resistor. Another transistor activated by the first transistor passes current to a fuse to open the fuse, permanently indicating a deployment event when the airbag was disabled. A latch circuit holds the second transistor on to assure sufficient time to open the fuse by melting.

2 Claims, 2 Drawing Sheets

AIRBAG SUPPRESSION CONTROLLER WITH CRASH STATE EVIDENCE

FIELD OF THE INVENTION

This invention relates to supplemental restraint systems (SIRs) and particularly to a controller for selectively disabling an air bag and having the capability to leave a permanent record of the controller state during a crash.

BACKGROUND OF THE INVENTION

SIR systems used in automotive vehicles commonly have a plurality of airbags to provide frontal protection and side protection for both passenger and driver positions. In at least some jurisdictions it is considered to be desirable to offer an option to suppress or disable one or more of the airbags either directly by the vehicle operator or by authorized service personnel. It is desirable to have an indicator viewed by the operator which shows the state of each airbag as well as to have a permanent record of an airbag disabled state in the event of a crash. In addition, the disabling must not interfere with diagnostic processes performed by the crash sensing module, else a fault warning would be displayed where, in fact, there is no fault. Still another requirement is that the permanent record utility should be fully operative with those systems which use precision inflator resistances and with very short deployment current pulses, on the order of 100 μs.

A circuit for meeting some of the above objectives is described in the U.S. Pat. No. 5,544,914 to Borninski et al entitled "AIR BAG DISABLER CONTROL CIRCUIT". There a resistive test load is provided to take the place of the airbag inflator and a switch is operated to select either state. The dummy resistive test load allows a diagnostic operation to take place. A fuse in series with the resistive test load is used to indicate that deployment current has passed through the resistor, thereby indicating that the inflator was disabled when a crash occurred. The properties of such fuses are that they are available only in low precision resistance values so that the series combination of the resistive test load and the fuse cannot have high precision, and a relatively long current duration is needed to operate the fuse. Thus the proposed arrangement has no application to a SIR system which requires high precision test load values or which uses very short current pulses for airbag deployment. High precision test loads are not required where the circuit is specifically designed for a particular model SIR system. However, a suppression controller intended as a retrofit controller for a number of existing SIR products having various firing loop connectors and harnesses is able to operate correctly only when tight tolerances are maintained in the controller design; in that case a precision test load is required.

SUMMARY OF THE INVENTION

It is therefore an object of the invention to selectively disable airbags in a wide variety of systems using a single controller construction. Another object is to record the state of airbag enablement where the deployment current has a very short duration.

A suppression controller is interposed between a crash sensor circuit output and an airbag inflator for each airbag. Each controller includes a switch which in one state directly connects the sensor circuit output to the inflator to effect airbag deployment during a crash. The switch in a second state connects a precision resistor to the sensor circuit output to accurately simulate the inflator. In the second switch state a diagnostic operation conducted by the sensor circuit will perform correctly using the precision resistor.

A sensing and latch circuit is connected across the precision load resistor to determine when deployment current is flowing in the load resistor, then applying current to a fuse and latching the current on to ensure that the fuse will melt and thereby open to afford a permanent indication that deployment current was produced when the switch was in the second state to disable the airbag.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to an airbag suppression controller which is constructed especially to operate with a large number of SIR models without modification. It will be understood, however, that the same basic design is also useful when specifically built for a particular SIR model.

Figure 1:
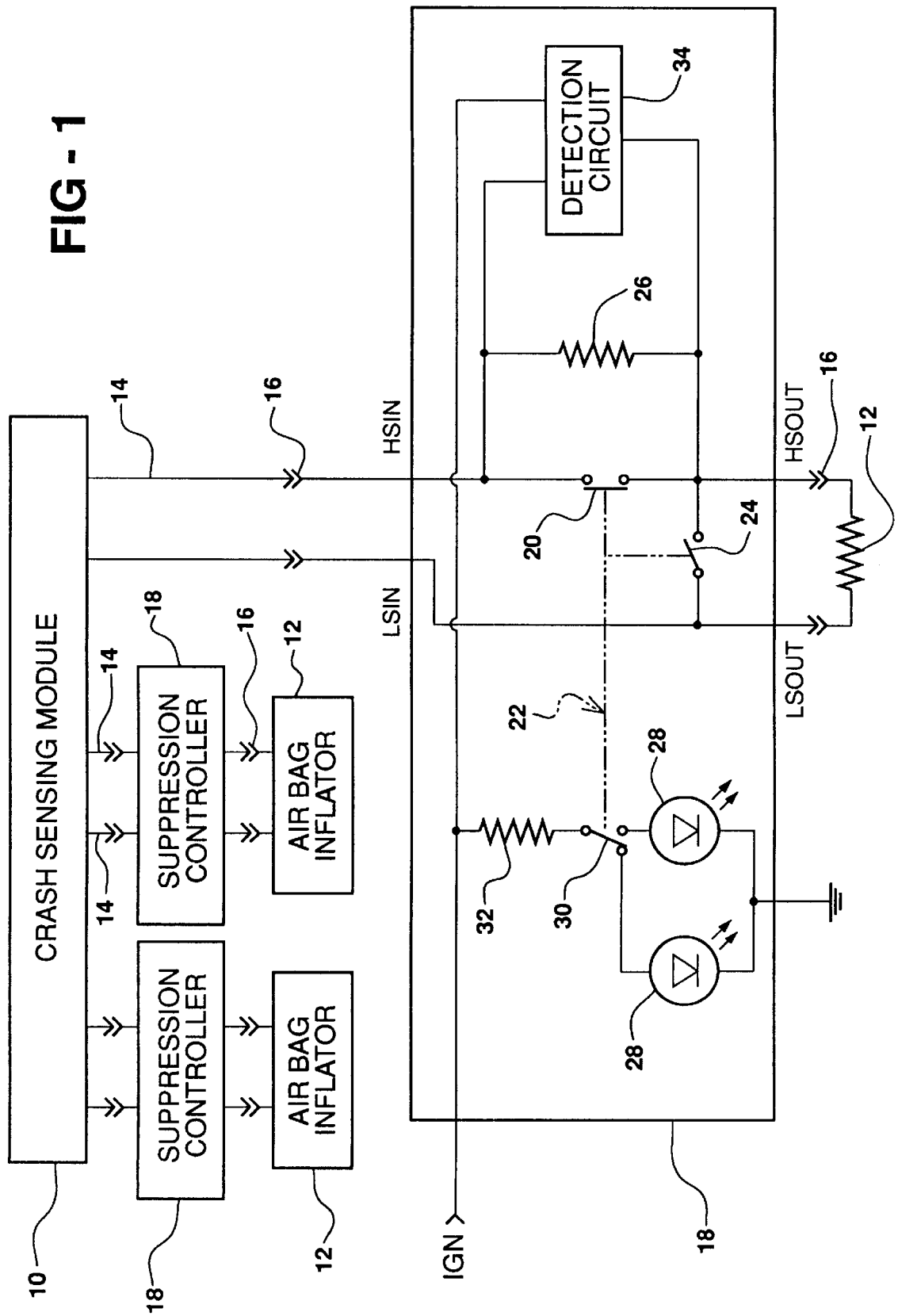
FIG. 1 is a schematic diagram of a crash sensing system having a suppression controller according to the invention.

Referring to FIG. 1, a crash sensor module 10 is one of several well known devices which respond to vehicle acceleration to determine that a crash is imminent and to produce deployment current to each of one or more airbag inflators 12 which appear in the form of resistors. Lead pairs 14 typically connect the module to each airbag inflator through connectors 16. Each lead pair comprises low side and high side conductors. In this system a suppression controller 18 is interposed at the connectors 16 between each lead pair 14 and its corresponding inflator 12.

One of the controllers 18 is shown in detail and the others are the same. Low side in LSIN and high side in HSIN terminals connect to the lead pair 14 and low side out LSOUT and high side out HSOUT terminals are connected to the inflator 12. The low side terminals are tied together directly and the high side terminals are connected through a normally closed pole 20 of a three-pole switch 22. A normally open second pole 24 of the switch is connected across the output terminals thereby shunting the inflator when closed. A precision load resistor 26 is connected across the pole 20. When the switch 22 is in the state shown, the inflator is in circuit with the module 10 outputs and the load resistor 26 is shunted. Then the inflator is enabled and the airbag will be deployed if the module 10 produces a deployment current. When the switch 22 is in the other state the inflator 12 is shunted and any deployment current would flow through the load resistor 26. In either switch state low amperage diagnostic current will flow through the inflator 12 or the load resistor 26, depending on switch state, to test the circuit for continuity or other properties.

By using a 1% tolerance load resistor 26, a single resistor value can be chosen to represent the inflator resistance values for many SIR models where the inflator values are nominally the same (but not high tolerance) even though the resistance of the leads and connectors varies from model to model. This cannot be accomplished by a low tolerance load resistor or with a load resistor in series with a low tolerance element such as a fuse.

Two LEDs 28 of different colors are coupled to ground at one side and selectively connected through a third pole 30 of the switch 22 and a resistor 32 to an ignition line IGN. Then one LED will be illuminated depending on the switch state and the color will serve as an indication of whether the airbag is enabled.

The switch 22 may be chosen to be operated in any of several ways. It might be a manually operated toggle switch positioned for actuation by the vehicle operator so that an airbag may be enabled or disabled at any time. In another version a service technician may set circuit board jumpers to select airbag status. The switch position may also be under control of a microprocessor in the module 10; in that case a service technician may set a software code to establish the status of each airbag.

To make a permanent record of a crash event occurring while the inflator is disabled by switch 22, a detection circuit 34 is coupled across the load resistor 26 and is powered by the line IGN. The detection circuit will respond to a deployment current over 100 μs in duration to pass high current through a fuse and to latch the current on until the fuse melts. This allows detecting and recording the switch status during the crash which triggered the deployment current.

Figure 2:
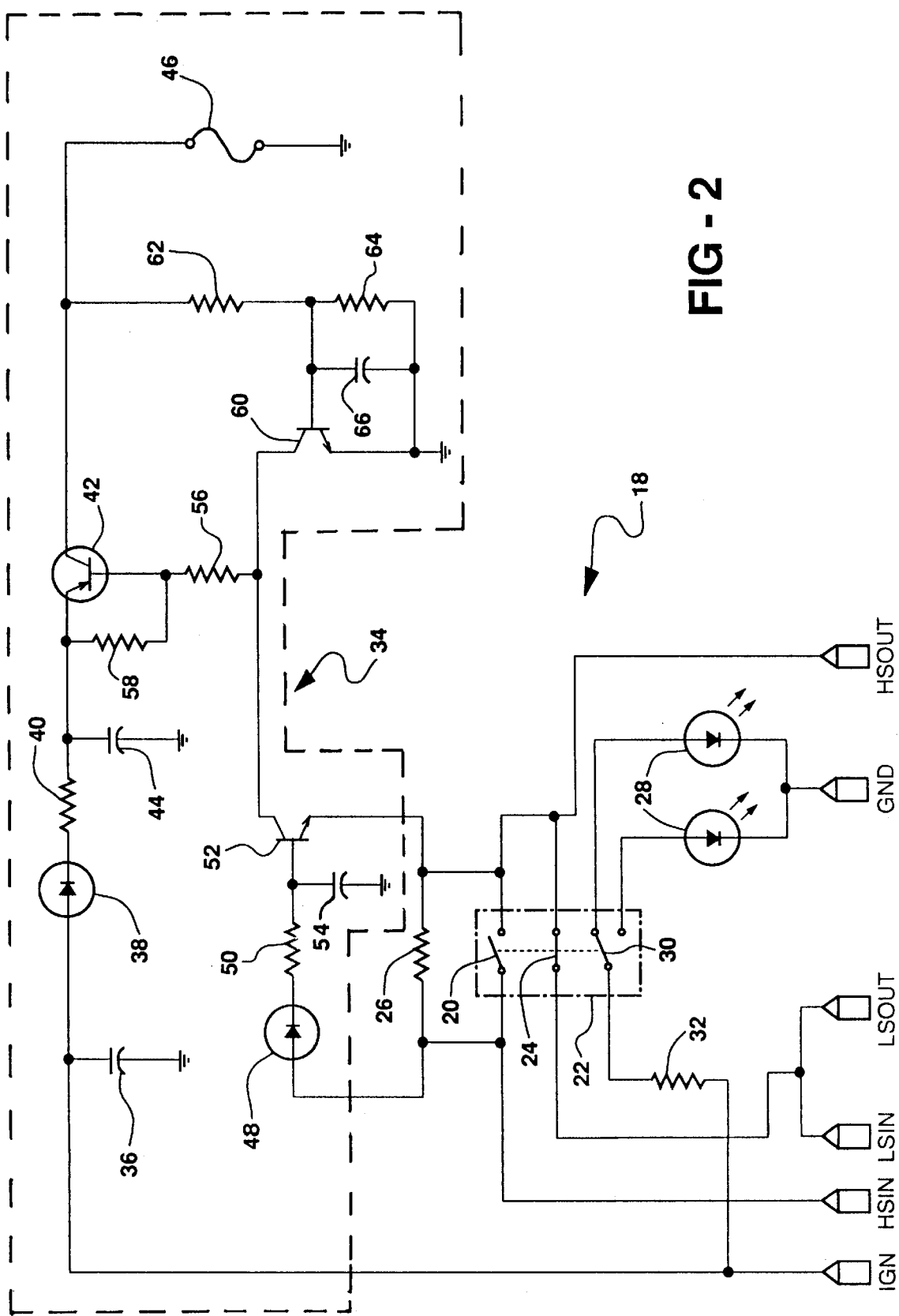
FIG. 2 is a schematic diagram of the suppression controller of FIG. 1.

FIG. 2 shows the details of the detection circuit 34. The ignition line IGN is coupled to ground through a capacitor 36 for noise suppression, and through a diode 38 and a resistor 40 to the emitter of a pass transistor 42. The emitter is connected to ground through a large capacitor 44. The capacitor 44 is charged by the ignition line to store an energy reserve. The resistor 40 insures sufficiently slow charging of the capacitor 44 to round the edge of the voltage waveform applied to the transistor upon ignition turn-on to prevent inadvertent turn-on of the transistor. The diode prevents backflow from the capacitor 44 in the event of accidental ignition grounding. A fuse 46 is connected between the collector of transistor 42 and ground. The fuse preferably is a fast blow surface mount type and will be opened or blown by melting if the transistor is turned on for a sufficiently long time, say, 2 or 3 ms.

A diode 48 connected to the high side of the load resistor 26 is coupled through a resistor 50 to the base of a detecting transistor 52 which has its emitter connected to the low side of the load resistor. A capacitor 54 is connected from the transistor 52 base to ground to form a low pass filter with the resistor 26. The filter is chosen to prevent transistor actuation for current pulses less than 100 μs. This guards against spurious activation caused by RF interference. The base of the pass transistor 42 is connected through a resistor 56 to the collector of transistor 52. A pull-up resistor 58 connected between the emitter and base of the pass transistor 42 prevents turn-on by any leakage current in detecting transistor 52. However when deployment current flows through load resistor 26 sufficient voltage is induced to turn on the detecting transistor 52. The resulting current flow through transistor 52 and the base of transistor 42 turns on the transistor 42 to effect current flow through the fuse 46. Small currents in the load resistor less than the deployment current do not induce sufficient voltage to forward bias the diode 48 and the transistor 52.

To maintain the current flow a latch transistor 60 has a grounded emitter, its collector is connected to the low side of resistor 56 and its base is connected through a resistor 62 to the collector of transistor 42. When the transistor 42 conducts the voltage drop in the fuse 46 is sufficient to turn on the latch transistor 60 which provides a ground path for the base of pass transistor 42, thus latching on the pass transistor indefinitely. A pull-down resistor 64 and a capacitor 66 between the base of transistor 60 and ground ensures that the transistor 60 will be off at start up.

It will thus be seen that a fuse or other visible indicator can be used to record deployment current in the load resistor but it does not in any way interfere with the operation of the load resistor or affect its value. In addition, the fuse can be made to respond to very short pulses of deployment current which would be too short to directly open a fuse.

The embodiments of the invention in which an exclusive property or privilege is claimed are defined as follows:

1. A deployment suppression circuit for a vehicular restraint system including a deployment module having terminals for supplying deployment current to an air bag inflator during a crash event, the suppression circuit comprising:

a precision resistor having a resistance corresponding to a resistance of said airbag inflator;

switch means for selectively connecting the terminals to the airbag inflator to permit airbag deployment or to the precision resistor to suppress airbag deployment;

a fuse electrically isolated from said deployment current; and a detection circuit including first transistor means coupled across the precision resistor for detecting a voltage drop due to a flow of said deployment current in the precision resistor to trigger a second transistor means to supply current to said fuse sufficient to open said fuse, thereby to permanently evidence deployment suppression during a crash event, even when said deployment current would be insufficient to open said fuse.

2. The deployment suppression circuit of claim 1 further comprising:

a latch circuit for maintaining the current supplied by said second transistor means.

* * * * *